United States Patent
Vasel

[15] 3,651,442
[45] Mar. 21, 1972

[54] DETECTION DEVICE

[72] Inventor: Alfred W. Vasel, 222 Linwood St., Abington, Mass. 02351

[22] Filed: Dec. 10, 1969

[21] Appl. No.: 883,969

[52] U.S. Cl. ............................ 338/17, 250/217 F, 340/228 S
[51] Int. Cl. ........................................................... H01c 7/08
[58] Field of Search ............... 338/15, 17, 18, 19; 250/209, 250/217 F; 340/228, 228 S

[56] References Cited

UNITED STATES PATENTS

| | | | |
|---|---|---|---|
| 3,062,961 | 11/1962 | Kalns et al. | 250/209 X |
| 3,188,593 | 6/1965 | Vasels et al. | 338/18 |
| 3,222,661 | 12/1965 | Vasels et al. | 340/228 |
| 3,122,638 | 2/1964 | Steele et al. | 340/228 X |

Primary Examiner—Rodney D. Bennett, Jr.
Assistant Examiner—R. Kinberg
Attorney—Robert E. Ross

[57] ABSTRACT

An optical fire detector in which a red-responsive cell and a blue-responsive cell are connected into a voltage divider circuit, and a third cell non-responsive to a specific frequency band is connected between the junction of the first two cells and the input of an amplifier of an alarm circuit.

5 Claims, 2 Drawing Figures

PATENTED MAR 21 1972 3,651,442
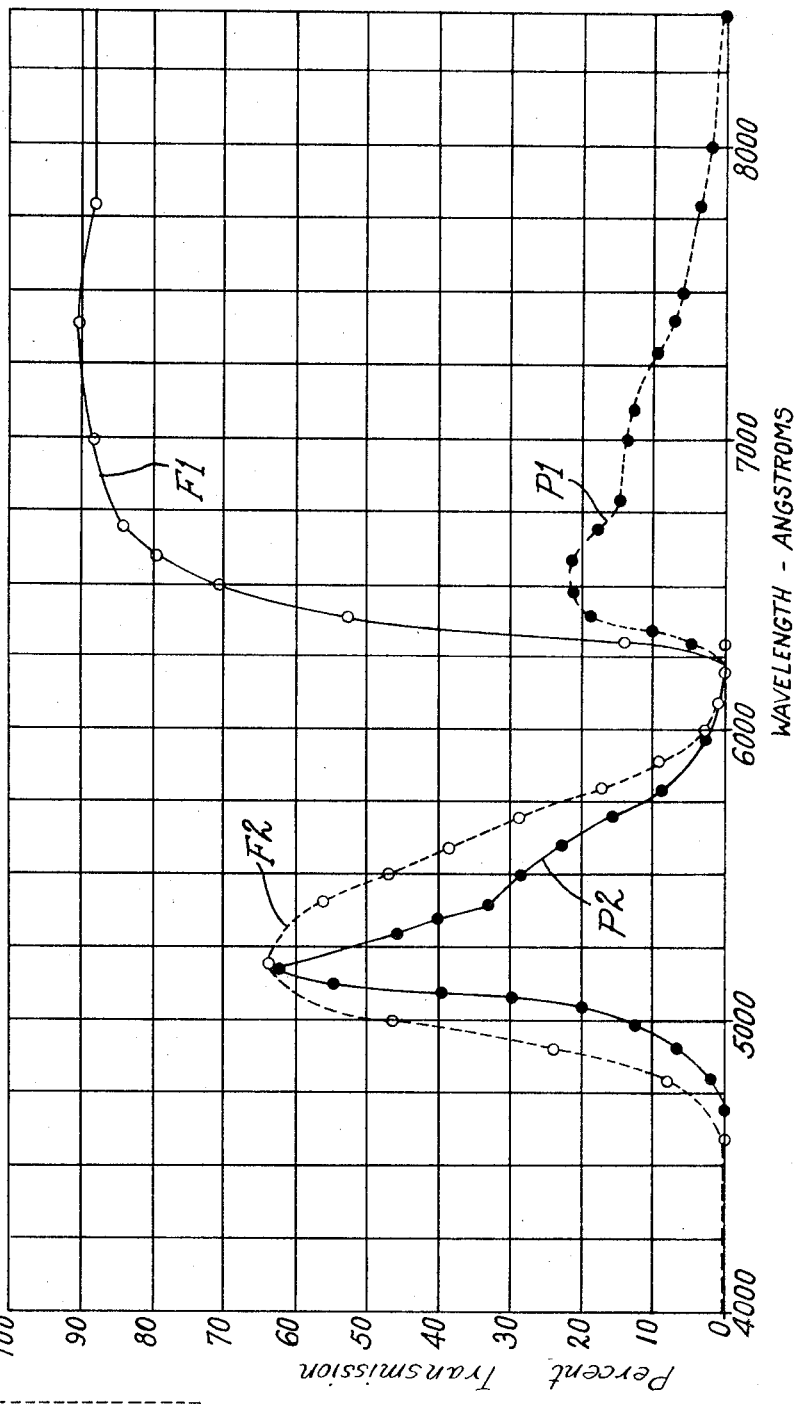
Fig. 2
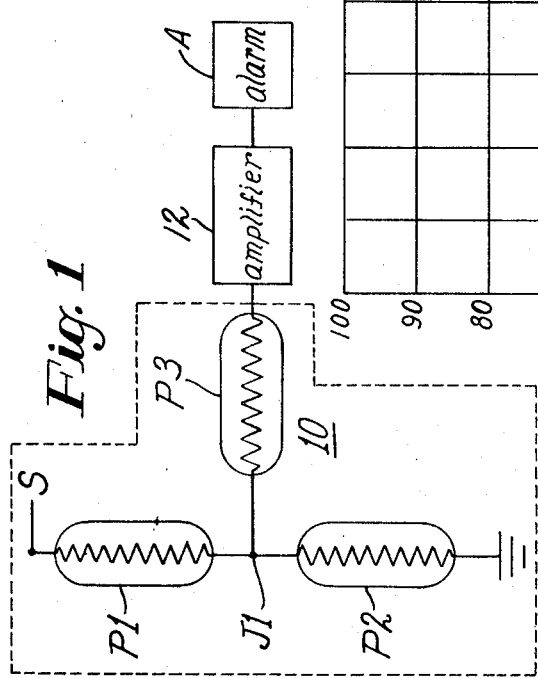
Inventor
Alfred W. Vasel
By his Attorney
Robert E. Ross 3,651,442

DETECTION DEVICE

FIELD OF INVENTION

This invention relates to optical fire detection apparatus in which the optical detection means comprises a pair of photo-responsive devices which respond differently to radiation from a fire, the cells being connected as a voltage divider, with the change in voltage at the junction of the cells being utilized to activate an alarm.

DESCRIPTION OF PRIOR ART

Optical fire detection systems of the type utilizing photo-responsive devices connected as a voltage divider customarily feed the voltage appearing at the junction of the devices directly into an amplifier with the output of the amplifier being connected to a relay controlling the operation of an alarm device. In U.S. Pat. 3,188,593, issued June 8, 1965, there is illustrated a detector assembly utilizing two photo-resistive devices in the manner described above, and in a copending application (Ser. No. 823,584, filed May 12, 1969) there is illustrated an amplifier which may be used with the detector of the above-identified patent.

Although devices based on the above-described type of apparatus have achieved considerable commercial success in some installations they have proved subject to false alarm when exposed to types of ambient illumination. For example, where used in certain types of military vehicles, it has been found that light from flashlights with red lenses such as are commonly used by military personnel during night operations can actuate the detector, producing a false alarm.

SUMMARY OF THE INVENTION

The invention disclosed herein relates to a fire detector in which a pair of photo-responsive devices having different response characteristics to radiation from a fire are connected in a voltage divider circuit across a voltage source. The junction between the photo-responsive devices is connected to an alarm-actuating amplifier through a third photo-responsive device. In one embodiment of the invention the third cell is responsive to a predetermined portion of the radiation from a fire, but is nonresponsive to a particular type of ambient light to which the detector may be exposed.

DESCRIPTION OF THE DRAWING

FIG. 1 is a schematic diagram of a fire detector system embodying the feature of the invention.

FIG. 2 is a graph illustrating the response of the various portions of the detector.

DESCRIPTION OF THE PREFERRED EMBODIMENT

Referring to the drawing, there is illustrated an optical fire detector system comprising a detector portion 10, and an amplifier portion 12 for actuating an alarm "A" when the detector portion 10 receives radiation from a fire, as will be described hereinafter.

The detector portion 10 may have a physical structure similar to that of the device shown in the above-mentioned U.S. Pat. No. 3,188,593, and comprises a first photo-responsive assembly P1 comprising a photocell and associated optical filter having light transmission characteristics as represented by curve F1, to cause the assembly P1 to be primarily responsive to radiation in the red-to-infra-red band, that is, above about 6,300 A., as shown by curve P1 in FIG. 2; a second photo-responsive assembly P2 comprising a photocell and associated optical filter having light transmission characteristics as represented by curve F2 to cause the assembly P2 to be primarily responsive to radiation in the blue-to-green band, that is, between about 500 A. and 6,000 A. as shown by curve P2 in FIG. 2; and a third photo-responsive assembly P3 which has a photocell and associated optical filter with light transmission characteristics to be discussed hereinafter.

The cells of assemblies P1 and P2 are connected in series through a common junction J1 across a DC voltage source S, and the cell of assembly P3 is connected between the junction J1 and the input of the amplifier 12.

As disclosed in U.S. Pat. No. 3,188,593 the function of the photo-responsive assemblies P1 and P2 are to cause sufficient voltage to appear at the Junction J1 to activate the alarm "A" when the assemblies P1 and P2 view a fire (assuming that the cell of assembly P3 is in the conductive state) but to not produce appreciable voltage at J1 when the devices P1 and P2 are exposed to other forms of radiation, such as sunlight and incandescent light. This results from the fact that the device P1, being responsive to the red-infra-red band, responds to a fire by a substantially greater drop in resistance than does P2, whereas in other forms of ambient radiation normally encountered the ratio of blue-green radiation to red-infra-red radiation is greater than in radiation from a fire, and therefore these latter forms of radiation cause the resistance of both devices to drop, so that the voltage rise at J1 is insufficient to activate the alarm.

Certain installations of the device shown in U.S. Pat. No. 3,188,593 have been in military vehicles in which flashlights with red lenses are customarily used during night operations and it has been found that when light from such a flashlight falls directly on a detector of the type shown in said patent, the alarm is actuated.

To avoid this result, the cell P3 is connected into the circuit between the junction J1 on one side and the amplifier and a resistor R1 on the other, so that if the cell P3 is not conductive, no voltage will appear at the amplifier even if a voltage appears at the junction J1.

In one specific embodiment of the invention for use in an application in which it is desired to prevent actuation of the alarm when red light, such as light from a flashlight with a red lens, falls on the cells, the assembly P3 may be constructed to have a response identical to the assembly P2.

In this embodiment, during operation of the device, assuming a supply voltage of 28 volts and an amplifier designed to actuate the alarm unit when the voltage at the amplifier input reaches 14 volts, the following results are obtained when the detector is exposed to various light conditions:

| Light cond. | P1 cell resist. | P2 cell resist. | P3 cell resist. | Volt. at J1 | Volt. at amp. input |
|---|---|---|---|---|---|
| Dark | 500 meg. | 500 meg. | 500 meg. | (¹) | (¹) |
| Incandescent source | 34k | 20k | 20k | 10.5 | 10.5 |
| Sunlight | 3k | 500 ohms | 500 ohms | 4 | 4 |
| Fire | 15k | 45k | 45k | 21 | 20 |
| Dark plus red flashlight | 90k | 6 meg. | 6 meg. | 28 | (¹) |

¹ Negligible.

As demonstrated by the data shown in the above table, when the photo-responsive devices are exposed to radiation from a fire, the resistance of the cell of assembly P1 drops to 15,000 ohms; however, the resistance to the cell of assembly P2 drops to only 45,000 ohms, providing a voltage at J1 of 21 volts. Since the assembly P3 in this particular embodiment has a spectral response which is the same as that of P2, Cell P3 resistance also drops to 45,000 ohms. If it is assumed that the input impedance of the amplifier is of the order of 2 megohms, then assembly P3 and the amplifier produce in effect a voltage divider so that substantially all of the voltage appearing at Junction J1 also appears at the amplifier input, and the alarm is activated.

When the detector is exposed to sunlight, the cells of both P2 and P3 drop substantially in resistance, as does the cell of P1, but since the drop is resistance of the P2 cell is greater than the P1 cell due to the responsiveness of P2 to the blue-green component of sunlight, the resulting voltage at junction J1 is only about 4 volts, which is considerably less than that required to activate the alarm. A similar result occurs when the detector is exposed to incandescent light.

When the detector, in darkness, is exposed to a beam from a flashlight with a red lens, such as is often used in night operations of military equipment, the P1 cell is greatly reduced in resistance, whereas the P2 and P3 cells are reduced to a considerably lesser degree, so that substantially the full source voltage appears at junction J1. However, since the P3 cell maintains an impedance higher than the input impedance of the amplifier, substantially no voltage appears at the amplifier input and the alarm is not activated.

Although in the above example the alarm may be activated by a red flashlight if the ambient light level is high enough to reduce the resistance of P3 substantially, as a practical matter, so there would be no need for the use of a flashlight if the ambient light level was at such a high level.

In the above-described embodiment of the invention, the assembly P3 has the same frequency response as the P2. Assemblies with other frequency responses may be used, so long as they have no substantial response to the frequency band of the flashlight lens being used.

Although the above-described detector is designed to solve a specific problem, to provide a response to fire radiation without responding to sunlight or relatively pure red light, the teachings of the invention may be utilized to construct other forms of detectors with different cell and filter combinations to provide spectral responses for other purposes.

Since certain other obvious changes may be made in the device without departing from the scope in the invention, it is intended that all matter contained herein be interpreted in an illustrative and not in a limiting sense.

I claim:

1. A detector responsive to radiation from a predetermined source and nonresponsive to ambient light from other sources, comprising two photo-responsive devices connected in series through a junction and a third photo-responsive device connected at one end to said junction, one of said first two photo-responsive devices being primarily responsive to light in one portion of the visible spectrum, the other of said first two photo-responsive devices being primarily responsive to light in another portion of the visible spectrum, and the third photo-responsive device being nonresponsive to a predetermined frequency range of the visible spectrum and responsive to other frequencies of the visible spectrum.

2. A detector as set out in claim 1 in which one of said first two photo-responsive devices is responsive to visible light in the red band, and the other is responsive to visible light in the blue-to-green band.

3. A detector as set out in claim 1 in which the third photo-responsive device is nonresponsive to light in the red band and responsive to light in the blue-to-green band.

4. A detector responsive to radiation from a fire but not responsive to sunlight or to a predetermined band of radiation contained in fire radiation, comprising two photo-responsive devices connected in series through a junction, and a third photo-responsive device connect at one end to said junction, one of said first two photo-responsive devices being primarily responsive to light in the red-to-infra-red band, the other of said first two photo-responsive devices being primarily responsive to light in the blue-to-green band, and the third photocell being primarily responsive to at least a portion of the light band to which one of the first two photo-responsive devices is responsive and substantially nonresponsive to light in other bands.

5. A detector system, comprising a pair of photo-responsive devices connected in series through a junction across a voltage source, and a voltage-responsive device connected to said junction through a third photo-responsive device, the input impedance of said voltage responsive device being high in relation to the impedance of said photo-responsive device when exposed to light in a predetermined frequency band.

* * * * *